Jan. 9, 1940.  W. H. HARRISON ET AL  2,186,412
OPTICAL SYSTEM FOR COLOR PHOTOGRAPHY

Filed June 25, 1935

INVENTORS:
William H. Harrison,
Edward C. Harrison,
BY
ATTORNEY.

Patented Jan. 9, 1940

2,186,412

UNITED STATES PATENT OFFICE 2,186,412

OPTICAL SYSTEM FOR COLOR PHOTOGRAPHY

William H. Harrison and Edward C. Harrison, Los Angeles, Calif.; Dolly V. Harrison, owner of the entire right of said Edward C. Harrison, deceased, by decree of court, assignors, by mesne assignments, to Dunningcolor Corporation, Los Angeles, Calif., a corporation of California Application June 25, 1935, Serial No. 28,283

7 Claims. (Cl. 88—1)

This invention relates in general to color photography and more specifically to a means of producing two identical color-separation images on closely adjacent picture areas.

In the production of wide angle pictures, it is customary to employ two short focal length lenses whose optical centers are spaced apart a distance equal to the center distance of the two part pictures to be produced. In such an arrangement a beam splitter is usually placed in front of the lenses whose center distance equals that of the lenses so that one lens receives its picture directly and the other lens receives its picture from the same angle, but by a double reflection. The problem always encountered in this type of beam splitter however has been to create a large enough entrance opening for both the direct and the reflected images and at the same time prevent direct light from reaching the lens receiving the reflected image, especially where it is desired to place the pictures close together. For instance on motion picture film, the lenses must be either slightly sawn off or the edges almost touching, which exposes a portion of the lens receiving the reflected image to direct light from the field of view. Obviously it is impossible to place a mechanical shield in the beam splitting means in any position where it will not either shadow one or the other of the pictures, or allow direct light to enter the lens which is to receive the reflected image.

It is therefore the principal object of this invention to provide an optical shield which excludes all light from the lens receiving the reflected image except the light coming from the reflecting surfaces in the beam splitting means.

It is also an object to provide a means for easily and accurately setting and maintaining the exact center distance of the beam splitter, so that it will be possible to inter-cut into the same picture, film produced by different units. Still other objects will be more readily understood by referring to the following description and the accompanying drawing in which.

Figure 1:
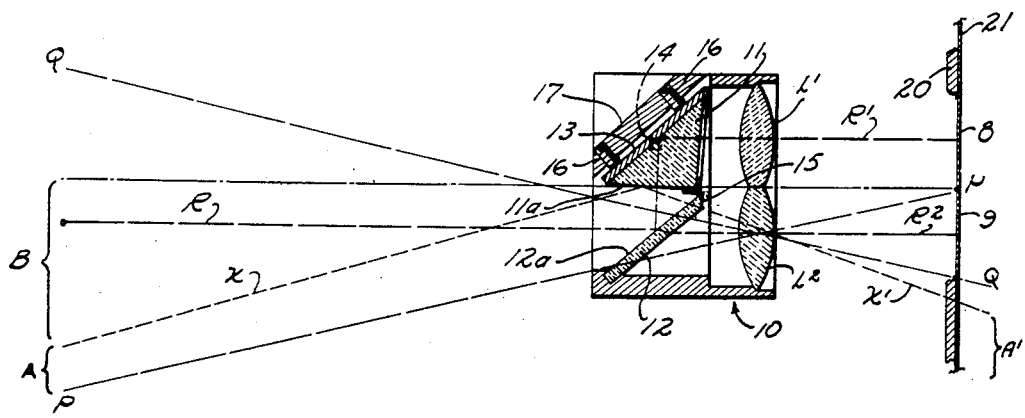
Fig. 1 shows diagrammatically one form of our invention in side elevation.

Referring now particularly to Fig. 1, the numeral 21 designates a film strip and 20 a film support or gate of a camera with an actuating mechanism not shown. L1 and L2 are two short focal length lenses adapted to form adjacent images on the film 21. The lens L2 receives its image R2 directly through an angularly disposed plate 12 having a semi-reflecting, semi-transparent surface 12a preferably formed by aluminum, gold or silver sputtering. Lens L1 receives its image R1 by a first reflection from the sputtered surface 12a of plate 12 which is then reflected directly into the lens by the full silvered face of a prism 11. The prism 11 is supported by a housing 13 movably suspended on a pivot 14, so that it may be easily and accurately adjusted in the proper relation to plate 12 by means of two screws 16 in a support 17.

The prism 11 is disposed so that its entrant face 11a is on a line between the two lenses and may be substantially parallel to the optical axes of said lenses, however when using wide angle lenses we find it advisable to rotate the unit in a clockwise direction in Fig. 1 through a small angle so that the entrant face 11a makes a slight negative angle with the optical axes, an angle of approximately 5° being suitable. It will be seen that the reflected beam in traversing the space between semi-reflecting face 12a and the reflecting face of the prism 11 passes from a medium of one index of refraction into a medium of a different index of refraction, the plane of division of said media being a highly polished surface which reflects light striking it at an angle greater than its critical angle and transmits light striking at an angle less than its critical angle, the critical angle of course depending upon the difference between the refractive indices of the two media.

Referring again to the Fig. 1, the lines P—P and Q—Q indicate the extreme rays of the field of view of the lenses L1 and L2, for the picture areas 8 and 9 respectively and all rays within these extremes which strike surface 12a are partially reflected thereby, the reflective portions being transmitted by entrant face 11a to the reflecting face of prism 11 and thence to lens L1. Rays included in the angle A which strike entrant face 11a direct are reflected thereby to points below the aperture 9 as indicated by A1. Rays included in the angle B which strike entrant face 11a direct are likewise reflected thereby but are blocked off by an opaque wall 15 adjacent the inner end of entrant face 11a which wall may be formed by blackening the upper end of plate 12 as indicated. It will thus be seen that all rays striking the entrant face or plane of division between the two media at an angle greater than the critical angle thereof are reflected in such a manner as to be prevented from reaching either picture area. Obviously the setting of the unit as to angle, and the width of blackening of the end of plate 12 at 15, can be readily adjusted so as to completely eliminate any ghosts in the picture areas under any and all conditions.

Adjustment of screws 16 rotates the prism 11 on its pivot 14 and changes the center distance of the two images by changing the direction of R1. Although only a slight amount of adjustment is usually necessary as the reflecting surfaces of prism 11 and plate 12 should be substantially parallel, means for adjusting is highly desirable as a center distance difference between units in the order of .001" or more is fatal to the intercutting of films into the same film strip, as the pictures would follow out of register the amount of the center distance difference.

Figure 2:
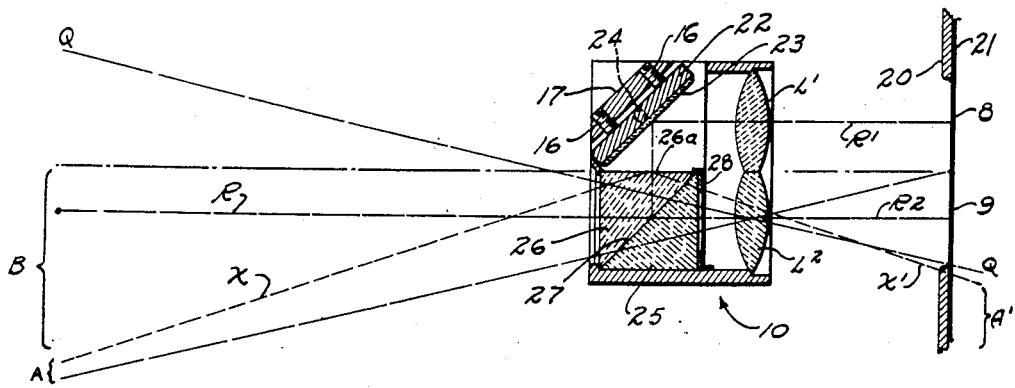
Fig. 2 shows an optional form employing the same principle.

Referring now to Fig. 2 wherein a modified form of our invention is illustrated, it will be seen that the light splitting assembly 10 comprises substantially the same parts designated by the same numbers as in Fig. 1, but that their positions are somewhat modified. In this figure we again have a gate 20 with a sensitized film 21 thereacross and a pair of juxtaposed lenses L1 and L2 in front of the gate and adapted to focus separate images 8 and 9 on adjacent portions of the film 21.

Directly in front of lens L2 is a prism block comprising two right angled prisms 25 and 26 with their hypotenuses cemented together to form a semi-reflecting and semi-transparent face 27 as by aluminum, gold or silver sputtering. The prism block is preferably disposed so that the upper face 26a of prism 26 makes a very slight angle with the optical axes of the lenses L1 and L2, the angle preferably being between 4° and 6°. Disposed above the prism block and separated therefrom by a medium of different refractive index is a simple reflecting surface 23 supported by a back 22 adjustably held to a frame 17 by a pivot 24 and screws 16, in substantially parallel relationship to interior face 27 of the prism block. By this arrangement part of the light rays falling on face 27 will be transmitted therethrough directly to lens L2 to be recorded as image 9. The balance of the light rays will be reflected upwardly to the reflector 23 and thence through lens L1 to be recorded as image 8.

It will be readily apparent to those skilled in the art that the effect and function of emergent surface 26a is identical with that previously explained as to entrant surface 11a of prism 11. The rays included by the angle A will be reflected by surface 26a to fall below the gate 20 as shown by A1. All rays in the angle B will be also reflected by surface 26a, but will be blocked off by blackened surface or wall 28 so that all possible extraneous rays are thus effectually prevented from reaching the image areas 8 or 9. Thus it will be seen that all rays directly striking surface 26a at an angle greater than its critical angle are either reflected outside the picture area, or are blocked off by mask 28.

While we have illustrated and described our invention as formed with the lenses one above the other and the film travelling downwardly, it will be understood that this is merely for convenience in desscribing the orientation of the parts, and that the whole apparatus may be rotated about its horizontal axis to any position desired without in any way changing the relationship or functioning of the parts. Consequently, when in the claims we use the terms "vertical," "horizontal," "above," "below," and the like, they are to be read in their relative sense only, with the foregoing remarks in mind.

If, as is usually the case in producing color pictures, it is desired that the images 8 and 9 record different color values, appropriate filters of different colors may be conveniently located in the respective component beam paths. If the film or films are selectively sensitized filters of course are unnecessary.

From the foregoing it will be seen that we have provided a simple and effective means for excluding all direct light of the field from the lens which is to record an image by reflected light only. The respective rays emerging from the light splitting means may be kept separate and distinct by any suitable means such for instance as that shown in our copending application Serial No. 11,930, filed March 20, 1935, in which case one set of filters may be placed adjacent the light splitting means and the other set adjacent the picture areas, or, if desired, a mechanical septum may be employed in front of the lenses and the set of primary filters may be disposed immediately in back of the respective lenses, with the secondary filters adjacent the picture areas as before.

It will be evident to those skilled in the art that the two media in the light path between the semi-reflective surface and the full reflective surface may be accomplished in various ways optically equivalent to those herein described, as for example by providing a very thin sheet of glass or other polished transmissive substance in said path with media on either side thereof with refractive indices different from that of the plate, and that these media may be of any convenient substance. Also that the respective media through which the light passes may be of any convenient form whether solid, liquid or gaseous, so long as they are transparent at least two of them having different indices of refraction with a definite plane of demarcation at their juncture.

It is to be understood of course that the exact size and proportions of the various parts may be changed and adjusted to meet individual problems and that various types of lenses, prisms and reflecting surfaces may be employed without in any way departing from the scope of our invention as defined by the appended claims.

We claim as our invention:

1. In an optical system for producing two identical images of the same field upon closely adjacent portions of film, the combination of: an exposure aperture; a pair of lenses juxtaposed in the same vertical plane behind said aperture, the lower of said lenses being opposite said aperture, said lenses being so close together and to said aperture that direct light from said aperture will, unless prevented, reach the upper of said lenses and be directed on to its respective film area; a semi-reflecting surface angularly disposed between said aperture and said lower lens so that it will pass a portion of the light rays from said aperture directly to said lower lens and reflect a portion of said rays upwardly; a right-angled glass prism disposed in front of said upper lens and above said semi-reflecting surface and separated therefrom by an air space, the hypotenuse of said prism being substantially full reflecting to receive the rays reflected from said semi-reflecting surface and direct them to said upper lens, said full reflecting and semi-reflecting surfaces being substantially parallel to each other, the entrant face of said prism being substantially midway between the optical axes of said lenses, and substantially horizontal on its transverse axis, whereby all direct light from said aperture which would otherwise reach said upper lens and be directed upon its respective film area is reflected from said entrant face and thereby excluded from said lens.

2. An apparatus as defined in claim 1 in which the entrant face of said prism makes a slight negative angle with the optical axes of said lenses in the plane of said axes.

3. An apparatus as defined in claim 1 in which a mask is provided adjacent the upper end of said semi-reflecting surface for preventing certain of the rays reflected from the entrant face of said prism from reaching the film area of said lower lens.

4. In an optical system for producing two identical images from the same field upon closely adjacent portions of film, the combination of: an exposure aperture; a pair of lenses juxtaposed in the same vertical plane behind said aperture, the lower of said lenses being opposite said aperture, said lenses being so close together and to said aperture that direct light from said aperture will, unless prevented, reach the upper of said lenses and be directed on to its respective film area; a right-angled glass prism having its hypotenuse semi-reflecting angularly disposed between said aperture and said lower lens so that it will pass a portion of the light rays from said aperture directly to said lower lens and reflect a portion of said rays upwardly; a substantially full reflecting surface disposed in front of said upper lens and above said prism and separated therefrom by an air space and adapted to receive the rays reflected from said semi-reflecting surface and direct them to said upper lens, said surfaces being substantially parallel to each other, the emergent face of said prism being substantially midway between the optical axes of said lenses, and substantially horizontal on its transverse axis whereby all direct light from said aperture which would otherwise reach said upper lens and be directed upon its respective film area is reflected from said emergent face and thereby excluded from said lens.

5. In an optical system for producing two identical images from the same field upon closely adjacent portions of film, the combination of: an exposure aperture; a pair of lenses juxtaposed in the same vertical plane behind said aperture, the lower of said lenses being opposite said aperture, said lenses being so close together and to said aperture that direct light from said aperture will, unless prevented, reach the upper of said lenses and be directed on to its respective film area; a semi-reflecting surface angularly disposed between said aperture and said lower lens so that it will pass a portion of the light rays from said aperture directly to said lower lens and reflect a portion of said rays upwardly; a substantially full reflecting surface disposed in front of said upper lens and directly above said semi-reflective surface and adapted to receive the reflected light rays from said semi-reflecting surface and direct them to said upper lens, said surfaces being substantially parallel to each other and one of them being the hypotenuse of a right-angled glass prism which provides a portion of the light path for said rays reflected from said semi-reflective surface, the balance of said light path being air, the face of said prism adjacent said air space being substantially midway between the optical axes of said lenses, and substantially horizontal on its transverse axis whereby all direct light from said aperture which would otherwise reach said upper lens and be directed upon its respective film area is reflected from said entrant face and thereby excluded from said lens.

6. An apparatus as defined in claim 5 in which the face of said prism adjacent said air space makes a slight negative angle with the optical axes of said lenses in the plane of said axes.

7. In an optical system for producing two identical images from the same field upon closely adjacent portions of film, the combination of: an exposure aperture; a pair of lenses juxtaposed in the same vertical plane behind said aperture, the lower of said lenses being opposite said aperture, said lenses being so close together and to said aperture that direct light from said aperture will, unless prevented, reach the upper of said lenses and be directed on to its respective film area; a semi-reflecting surface angularly disposed between said aperture and said lower lens so that it will pass a portion of the light rays from said aperture directly to said lower lens and reflect a portion of said rays upwardly; a substantially full reflecting surface disposed in front of said upper lens and above said semi-reflecting surface and adapted to receive the rays reflected from said semi-reflecting surface and direct them to said upper lens, said surfaces being substantially parallel to each other; and a transparent block of a substance having an index of refraction different from that of air between said surfaces and in contact with one of said surfaces providing a portion of the light path for said rays reflected from said semi-reflective surface, the balance of said light path being air, the face of said block adjacent said air space being polished and substantially midway between the optical axes of said lenses, and substantially horizontal on its transverse axis, whereby all direct light from said aperture which would otherwise reach said upper lens and be directed upon its respective film area is reflected from said entrant face and thereby excluded from said lens.

WILLIAM H. HARRISON.
EDWARD C. HARRISON.